US012776601B2

(12) United States Patent
Okamura

(10) Patent No.: US 12,776,601 B2
(45) Date of Patent: Oct. 27, 2026

(54) CONNECTOR

(71) Applicant: JAPAN AVIATION ELECTRONICS INDUSTRY, LIMITED, Tokyo (JP)

(72) Inventor: Atsushi Okamura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 332 days.

(21) Appl. No.: 18/638,211

(22) Filed: Apr. 17, 2024

(65) Prior Publication Data

US 2024/0413560 A1 Dec. 12, 2024

(30) Foreign Application Priority Data

Jun. 8, 2023 (JP) ................................ 2023-094694

(51) Int. Cl.
*H01R 12/79* (2011.01)
*H01R 12/89* (2011.01)

(52) U.S. Cl.
CPC ............ *H01R 12/79* (2013.01); *H01R 12/89* (2013.01)

(58) Field of Classification Search
CPC ........ H01R 12/79; H01R 12/85; H01R 12/89; H01R 12/88; H01R 12/87
See application file for complete search history.

(56) References Cited

U.S. PATENT DOCUMENTS 6,471,541 B2 10/2002 Kunishi et al.
6,851,968 B2 * 2/2005 Tsunematsu ........... H01R 12/79 439/495
9,780,472 B2 * 10/2017 Ishimaru ................ H01R 13/24
2004/0002254 A1 1/2004 Tsunematsu
2007/0190869 A1 8/2007 Sung

FOREIGN PATENT DOCUMENTS

JP 2008-504645 A 2/2008

OTHER PUBLICATIONS

European Search Report issued in related European Application No. 24172526.6, dated Oct. 9, 2024.
First Office Action issued in related European Application No. 24172526.6, dated Sep. 2, 2025.

* cited by examiner

*Primary Examiner* — Ross N Gushi
(74) *Attorney, Agent, or Firm* — Greenblum & Bernstein, P.L.C.

(57) ABSTRACT

A connector includes a housing and terminals each having a fixation portion, an extension portion, and a connection portion. Each connection portion includes a connecting base portion, a first arm, and a second arm. The first arm includes a support portion and a sub-arm formed of a first sub-arm and a second sub-arm. The first sub-arm has a first contact portion and the second sub-arm has a second contact portion. The second arm has a pressing portion protruding toward a predefined location between the first contact portion and the second contact portion. Each connection portion is configured such that when a mating connection unit is inserted between the respective first arms and the respective second arms, the pressing portion presses against the mating connection unit and at least either contact portion of the first contact portion and the second contact portion establishes continuity with the mating connection unit.

17 Claims, 12 Drawing Sheets

CONNECTOR

TECHNICAL FIELD

The present disclosure relates to structures of connectors.

BACKGROUND ART

One conventional technique for connectors is to construct a connector for connecting a film wire to a board with no flips on the connector and to insert the film wire into the housing of the connector with a small force at the beginning and a large force only at the end to fix the film wire. This can prevent damage to or breakage of contact pins disposed on the film wire and also allows the film wire to be inserted at correct locations on terminals, stabilizing the fixation state of the film wire (see Japanese Patent Application Laid Open No. 2008-504645 (hereinafter referred to as "Patent Literature 1"), for instance). Patent Literature 1 discloses a connector for film wire that has multiple terminals inserted into a housing and fixed therein, and when a film wire is inserted into an insertion portion of the housing, contact pins on the film wire make close contact with contact portions of the terminals (see FIG. 1). Each terminal of the connector has the contact portion on one side and a seesaw member that makes seesaw movements about a center is integrally formed with the terminal at a location opposite the contact portion, such that the seesaw member makes seesaw movements with the film wire, thus stabilizing the fixation state of the film wire.

SUMMARY OF THE INVENTION

In the connector of Patent Literature 1, however, the seesaw member is formed such that a pressurization portion thereof is located opposite the contact portion of the terminal. If the pressurization portion and the terminal deviate from their opposing arrangement due to some effect such as an attachment error with the terminal, or if a force that separates the contact pins on the film wire and the contact portions of the terminals is generated by prying or the like, stable continuity may not be achieved.

In view of the foregoing problem, an object of the present disclosure is to provide a connector that can achieve more stable connection.

To solve the above-described problem, a connector according to the present embodiment includes: a housing including an insertion portion with a predefined width into which a mating connection unit having a plurality of mating terminals arrayed thereon can be inserted, and a base portion located at a predefined length from the insertion portion in an insertion direction, the insertion direction being a direction of inserting the mating connection unit; and a plurality of terminals, each including: a fixation portion with one end fixed to the base portion; an extension portion with one end being contiguous with the fixation portion and another end extending in a reverse insertion direction opposite the insertion direction; and a connection portion with one end being contiguous with the extension portion and another end extending in the reverse insertion direction, the connection portion being capable of establishing continuity with corresponding one of the mating terminals. The plurality of terminals are arrayed in a width direction, the width direction being a direction of a width of the housing. The connection portion of each of the plurality of terminals includes: a connecting base portion extending from the other end of the extension portion in an intersection direction intersecting the insertion direction and the width direction; a first arm extending from one end, on the intersection direction side, of the connecting base portion in the reverse insertion direction; and a second arm extending from another end, on the intersection direction side, of the connecting base portion in the reverse insertion direction. The first arm includes: a support portion extending from a predefined location on the first arm on an extension side to the second arm side in the intersection direction; a sub-arm formed of a first sub-arm extending from an end of the support portion on the extension side in the reverse insertion direction, and a second sub-arm extending from that end in the insertion direction; a first contact portion protruding from the first sub-arm to the second arm side; and a second contact portion protruding from the second sub-arm to the second arm side. The second arm includes a pressing portion protruding toward a predefined location between the first contact portion and the second contact portion. The connection portion of each of the plurality of terminals is configured such that when the mating connection unit is inserted between the respective first arms and the respective second arms via the insertion portion, the pressing portion presses against the mating connection unit and at least either contact portion of the first contact portion and the second contact portion establishes continuity with the mating connection unit.

Effects of the Invention

The connector of the present embodiment can achieve stable connection.

shows an element constituting a connection portion 64, and FIG. 8(*f*) shows an element constituting a first arm 66.

Figure 9A:
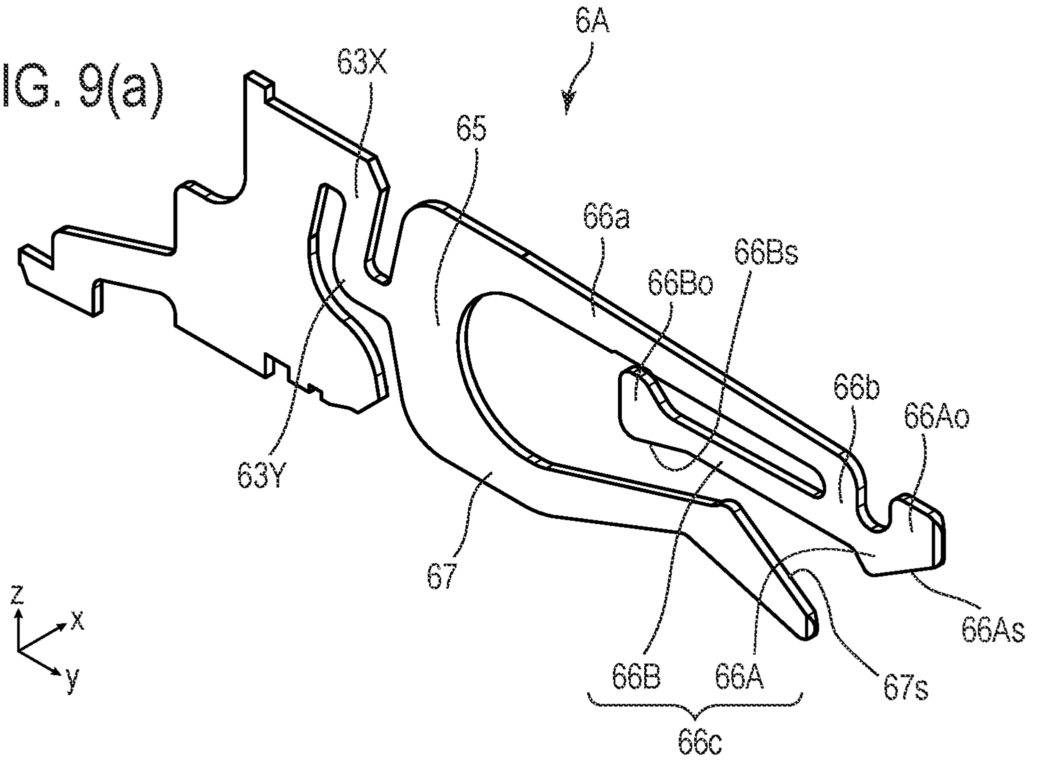
Figure 9B:
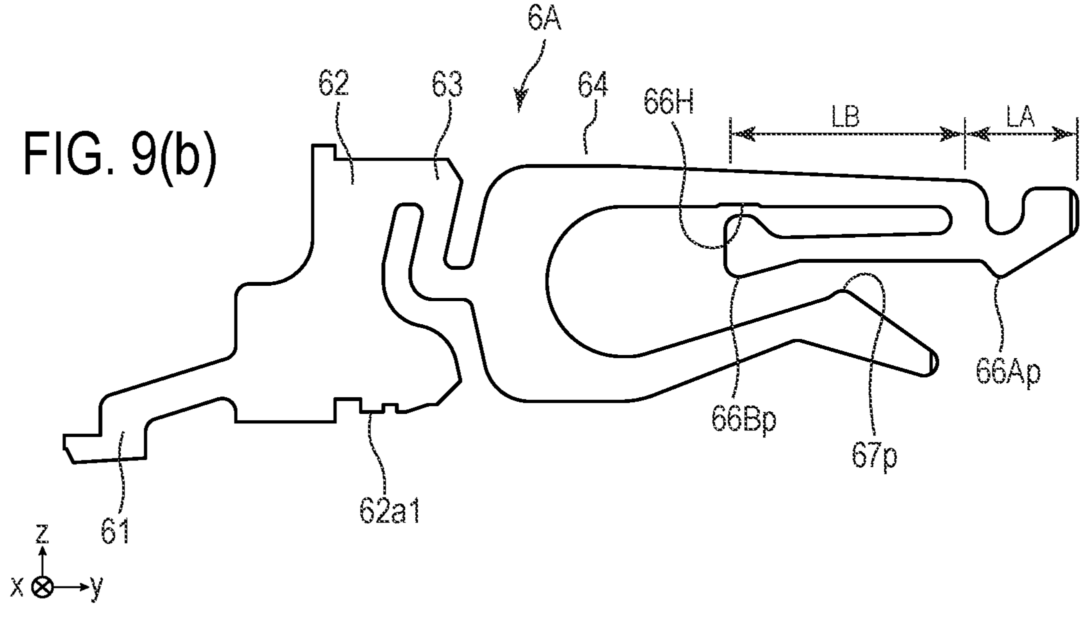

FIGS. 9(*a*) and 9(*b*) are diagrams for describing the terminal 6A, where FIG. 9(*a*) is a perspective view and FIG. 9(*b*) is a plan view.

Figure 10A:
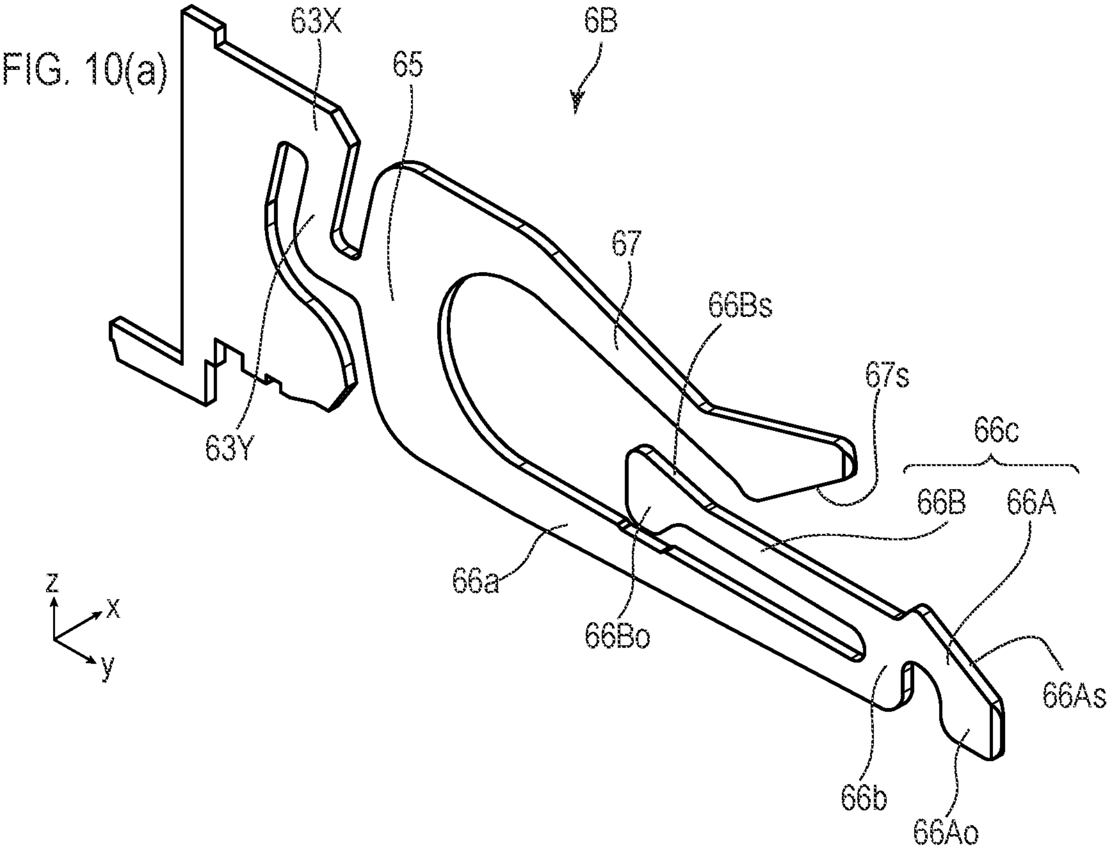
Figure 10B:
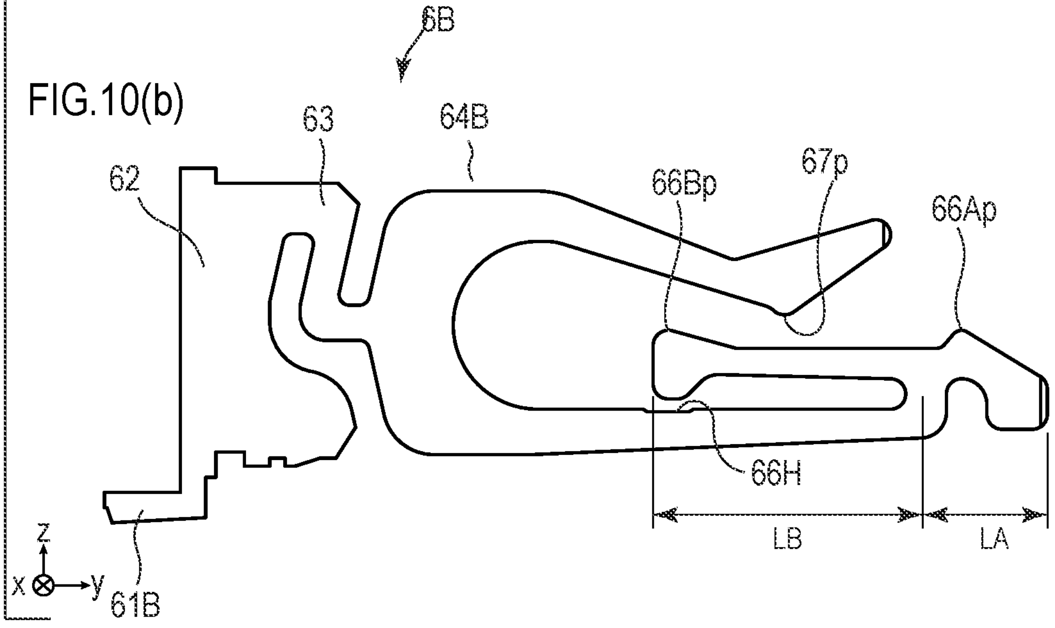

FIGS. 10(*a*) and 10(*b*) are diagrams for describing a terminal 6B, where FIG. 10(*a*) is a perspective view and FIG. 10(*b*) is a plan view.

Figure 6A:
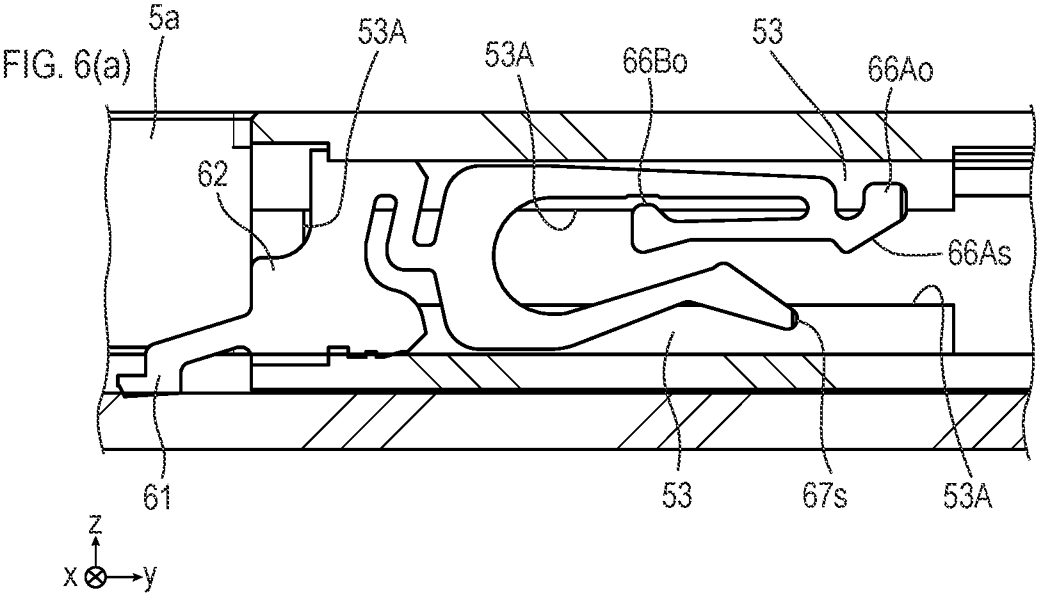
FIGS. 6(*a*) and 6(*b*) are diagrams for describing a positional relationship between terminals 6 and guide portions 53, where FIG. 6(*a*) is an enlarged view of region V in FIG. 4(*b*), and FIG. 6(*b*) is a schematic diagram as seen from the insertion portion 51 side for describing arrangement in width direction W.
Figure 6B:
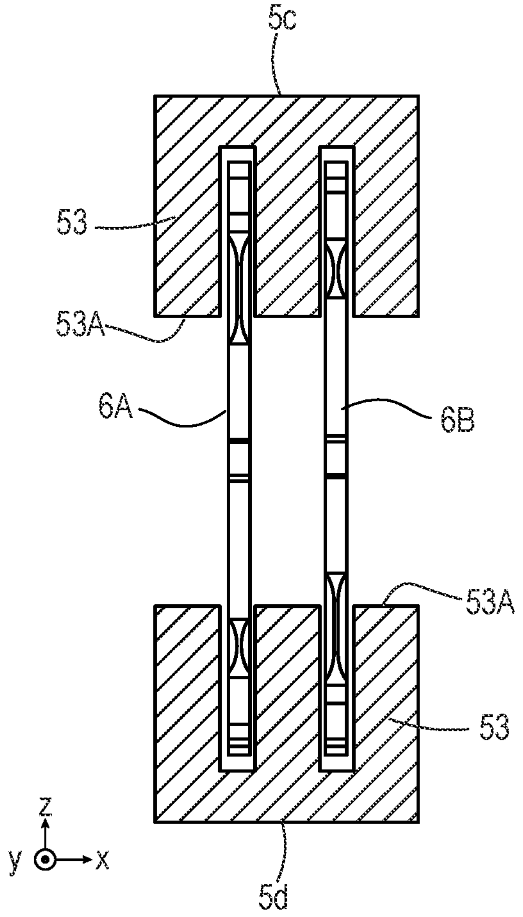
Figure 11:
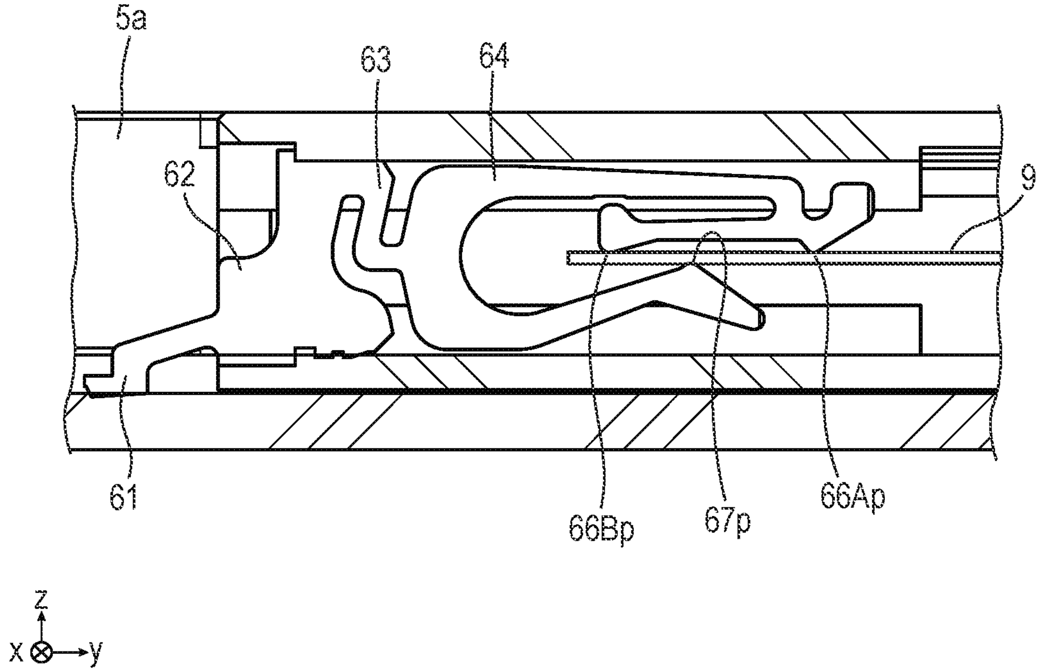

FIG. 11 shows a situation where the mating connection unit 4 is inserted in FIG. 6(*a*).

Figure 12:
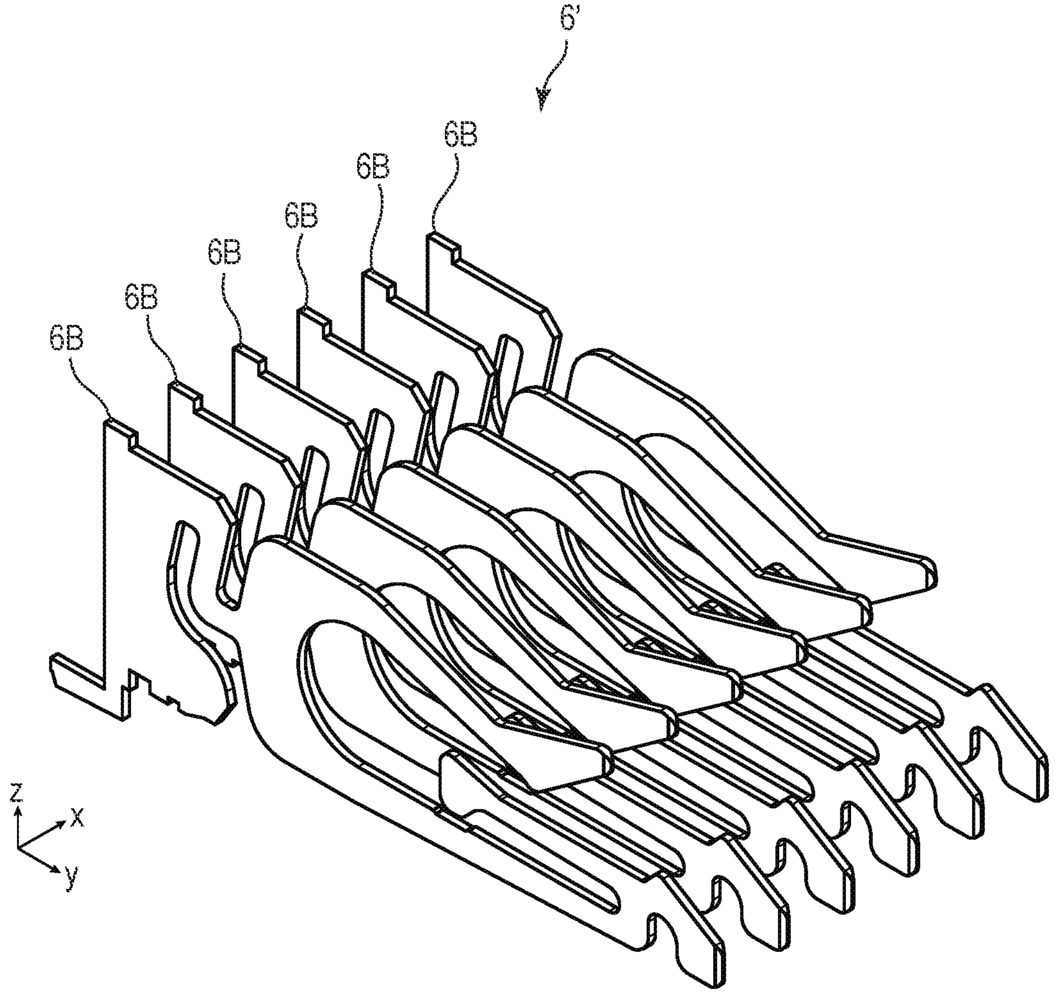

FIG. 12 is a perspective view of multiple terminals 6' uniformly configured in the same shape.

DETAILED DESCRIPTION OF THE EMBODIMENTS

An embodiment of the present disclosure is described below with reference to drawings. In the description that follows, components with the same function are denoted with the same reference characters and overlapping description is omitted.

Figure 1:
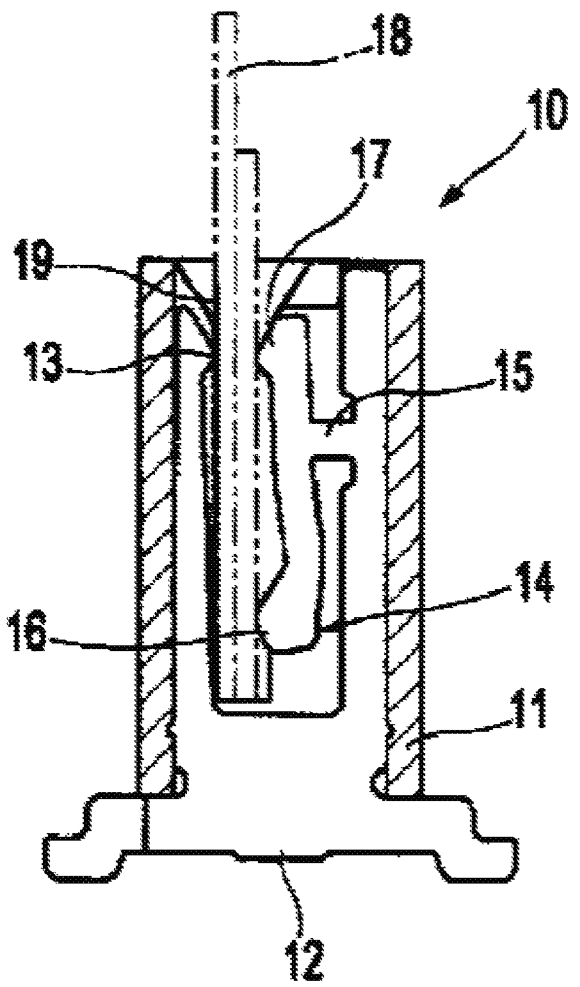
FIG. 1 PRIOR ART
FIG. 1 is a diagram for describing a conventional art of a connector.
Figure 2:
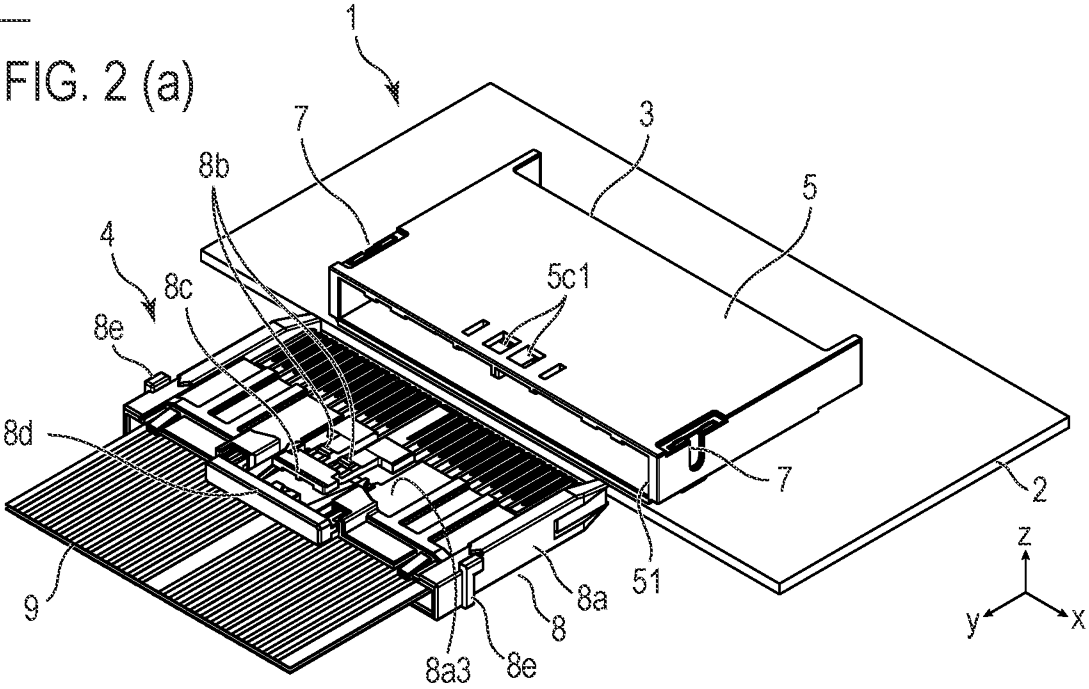
FIGS. 2(*a*) and 2(*b*) are perspective views showing a printed circuit board 1 and a mating connection unit 4 according to the present embodiment, where FIG. 2(*a*) shows a state before the mating connection unit 4 is inserted into a connector 3 and FIG. 2(*b*) shows a state after insertion of the mating connection unit 4 into the connector 3 is completed.
Figure 2B:
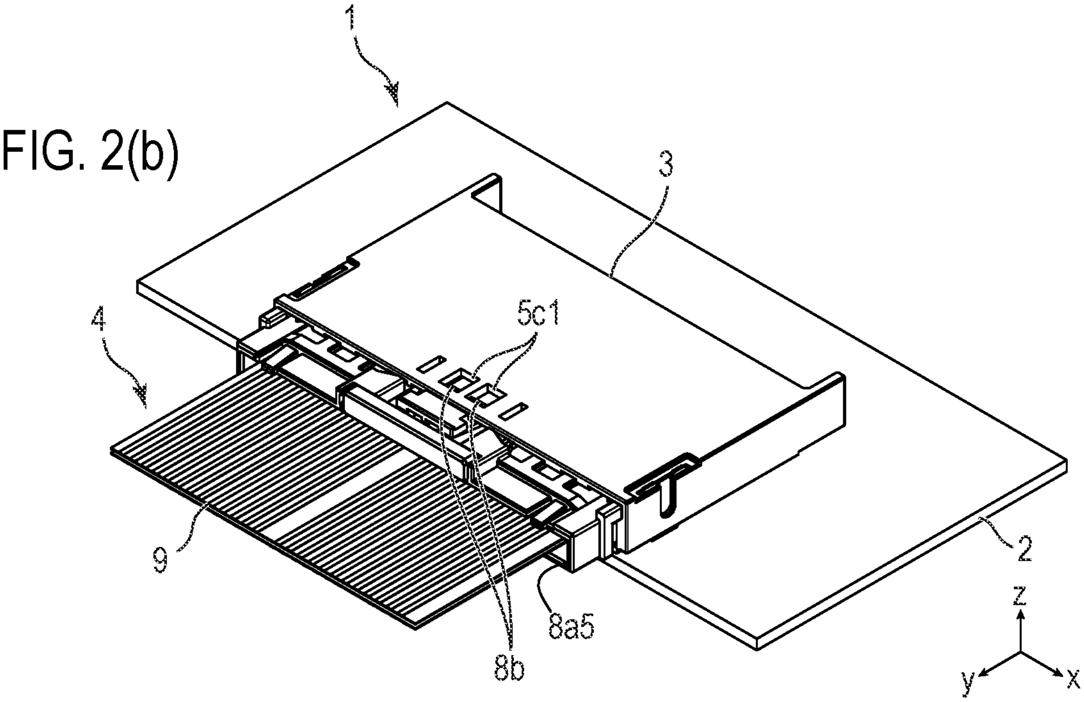
Figure 3A:
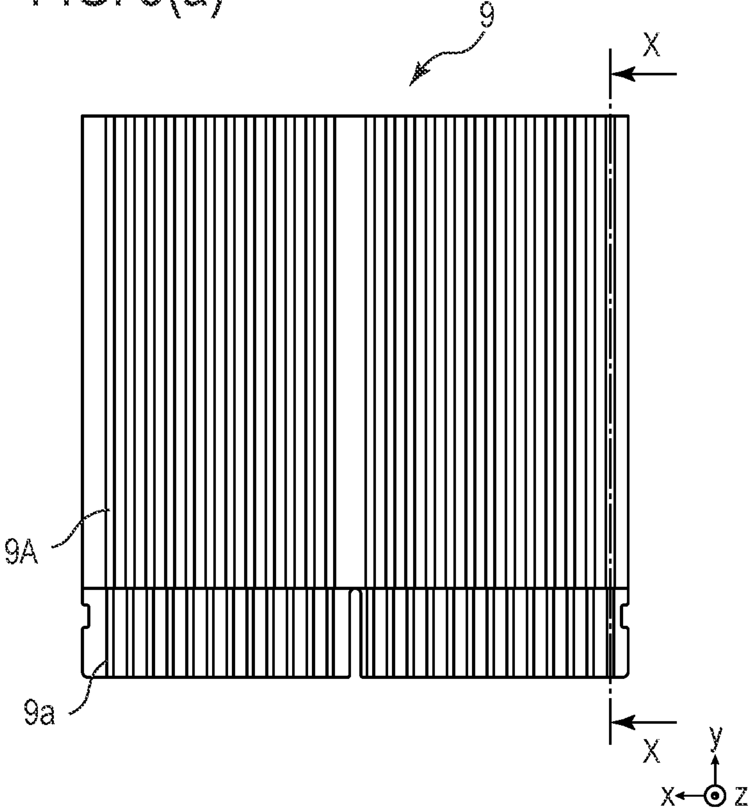
FIGS. 3(*a*), 3(*b*), 3(*c*) and 3(*d*) show a flexible wiring board 9, where FIG. 3(*a*) is a plan view, FIG. 3(*b*) is a cross-sectional view at X-X, showing an electrode 9*a* and its vicinity enlarged, FIG. 3(*c*) is a front view of an end as seen from the electrode 9*a* side, and FIG. 3(*d*) is an enlarged view of region Y.
Figure 3B:
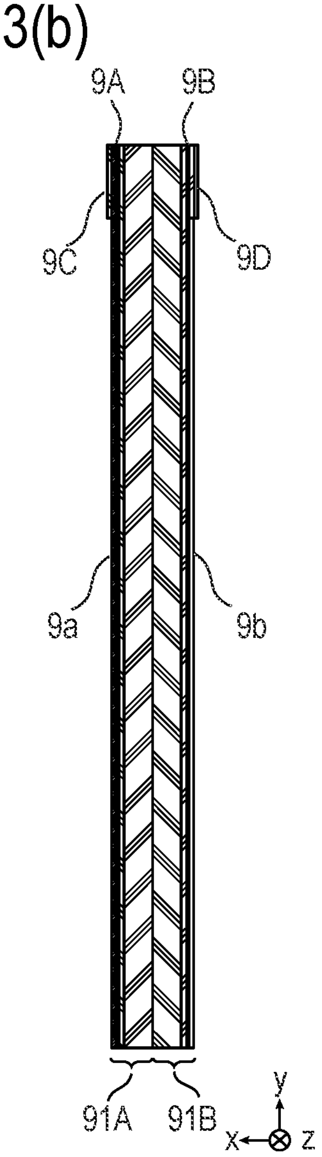
Figure 3C:
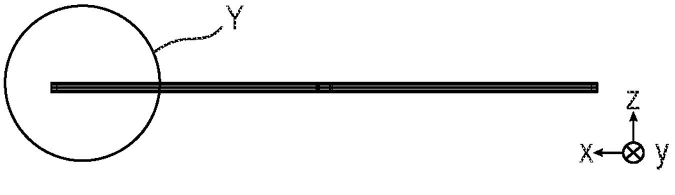
Figure 3D:
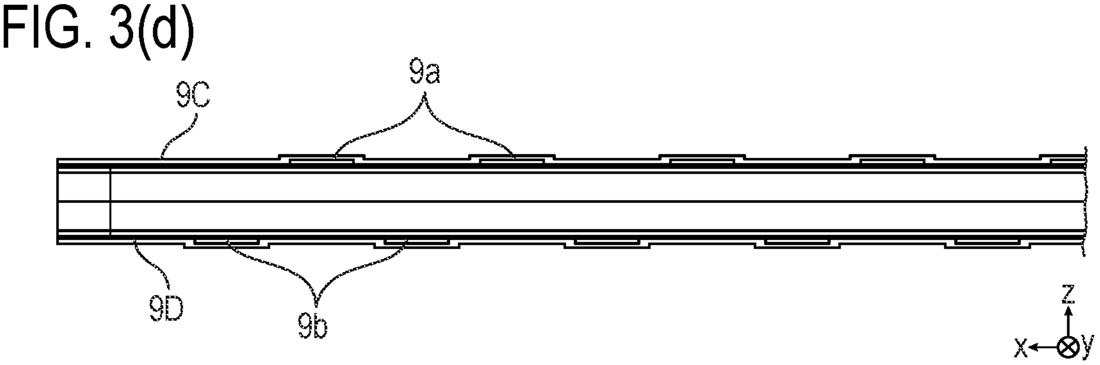

FIG. 2 is a perspective view showing a printed circuit board 1 and a mating connection unit 4 according to the present embodiment, where FIG. 2(*a*) shows a state before the mating connection unit 4 is inserted into a connector 3 and FIG. 2(*b*) shows a state after insertion of the mating connection unit 4 into the connector 3 is completed.

(Mating Connection Unit 4)

The mating connection unit 4 according to the present embodiment is formed of a flexible wiring board 9 and a mating insertion portion 8, as shown in FIG. 2. FIG. 3 shows the flexible wiring board 9, where FIG. 3(*a*) is a plan view, FIG. 3(*b*) is a cross-sectional view at X-X, showing an electrode 9*a* and its vicinity enlarged, FIG. 3(*c*) is a front view of an end as seen from the electrode 9*a* side, and FIG. 3(*d*) is an enlarged view of region Y. The flexible wiring board 9 in the present embodiment is a thin-plate-shaped wiring board made of polyimide as base material, for example. The flexible wiring board 9 has flexibility enough to allow it to bend 180 degrees at its center or higher so that its opposite ends in a long direction (when represented with a coordinate axis, in the positive-negative direction on the y-axis illustrated in FIG. 3(*a*)) are aligned with each other, for example. The flexible wiring board 9 in the present embodiment is formed of a first layer 91A and a second layer 91B as shown in FIG. 3(*b*), the first layer 91A and the second layer 91B being integrally formed by bonding to one another with a certain adhesive. However, the flexible wiring board 9 is not limited to this structure. For example, it may be made of simple double layering, instead of integral formation. The first layer 91A has multiple wires 9A arrayed in a width direction of the flexible wiring board 9 (the right-left direction in FIG. 3(*a*)), and an elongate electrode 9*a* for electrical connection with the connector 3 is provided at one end of each wire 9A. The wires 9A are covered with an insulation layer 9C for insulation. The second layer 91B has multiple wires 9B (FIG. 3(*b*)) arrayed in the width direction of the flexible wiring board 9 as with the first layer 91A, and an elongate electrode 9*b* for electrical connection with the connector 3 is provided at one end of each wire 9B. The wires 9B are covered with an insulation layer 9D for insulation. The multiple electrodes 9*a* and 9*b* are arranged offset (shifted) in the width direction of the flexible wiring board 9 from the positions at which they are opposite each other. This arrangement provides a staggered arrangement of the electrodes 9*a* and 9*b*, or multiple terminals, across the surface on the first layer 91A side and the surface on the second layer 91B side, as shown in FIG. 3(*d*). As the electrodes 9*a*, 9*b* serve as the terminals of the mating connection unit 4, the electrodes 9*a*, 9*b* are also called "mating terminals" in the present embodiment.

Figure 4A:
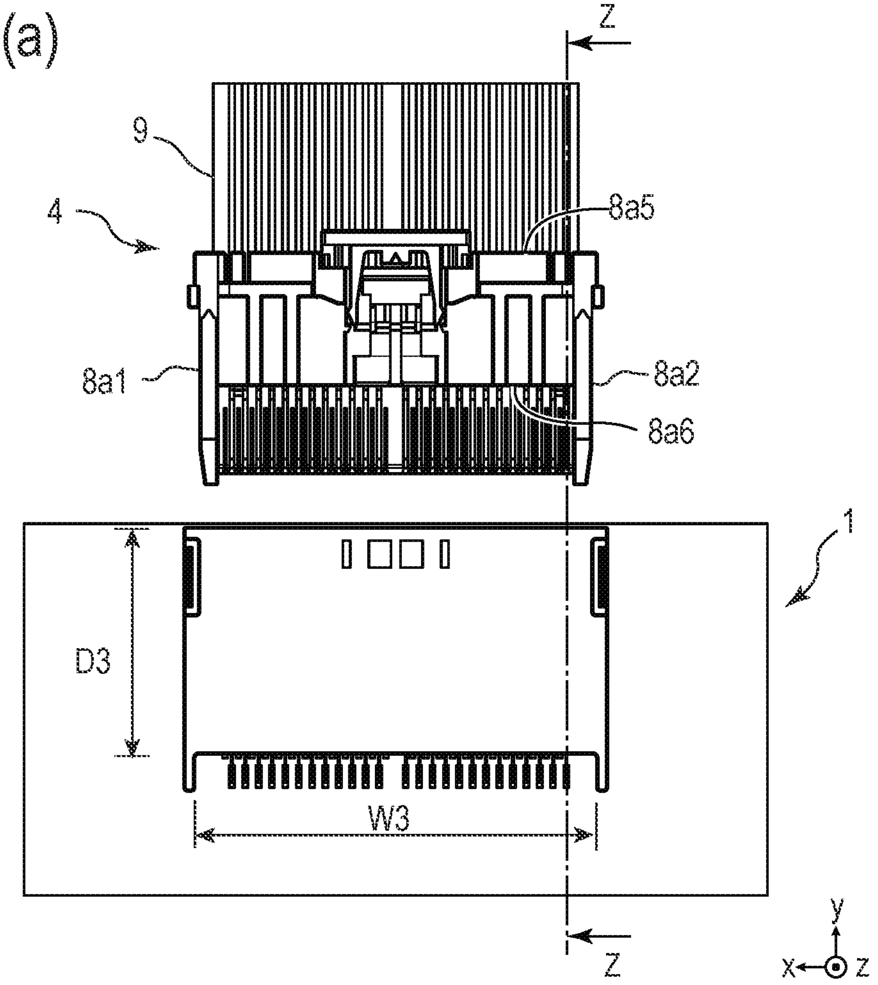
FIG. 4(*a*) is a plan view of FIG. 2(*a*), and FIG. 4(*b*) is a cross-sectional view of FIG. 4(*a*) at Z-Z.
Figure 4B:
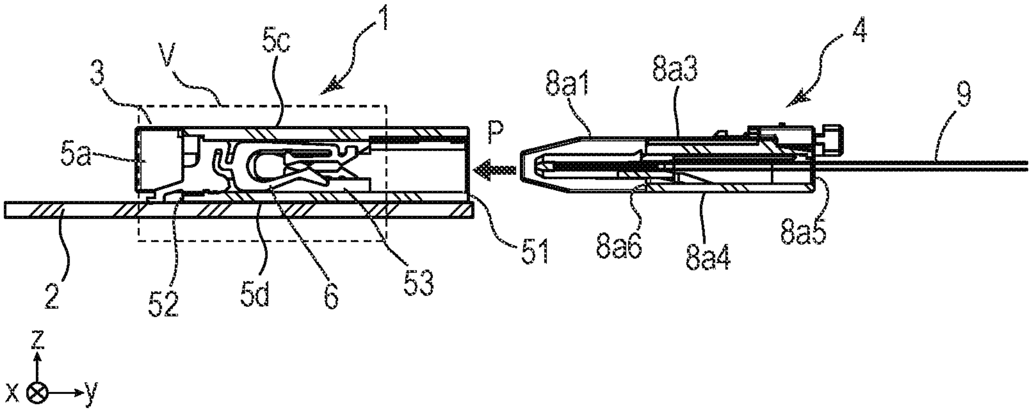

The flexible wiring board 9 has electrodes that are connectable to other apparatuses or devices at the end opposite the electrodes 9*a*, 9*b* (when represented with a coordinate axis, the positive direction side on the y-axis shown in FIG. 3(*a*)). In FIGS. 2 to 4, the electrodes connectable to other apparatuses or devices are not illustrated and only a part of the length of the flexible wiring board 9 is shown.

The mating connection unit 4 includes the mating insertion portion 8 to facilitate insertion into the connector 3 at the end of the flexible wiring board 9 on the side of the electrodes 9*a*, 9*b* (when represented with a coordinate axis, the negative direction side on the y-axis shown in FIG. 2(*a*)), as shown in FIG. 2(*a*). Main components of the mating insertion portion 8 include an insertion guide 8*a*, tabs 8*b*, a lever 8*c*, and a secondary lock mechanism 8*d*. FIG. 4(*a*) is a plan view of FIG. 2(*a*), and FIG. 4(*b*) is a cross-sectional view of FIG. 4(*a*) at Z-Z. The insertion guide 8*a* is substantially box-shaped, having a shape of a hollow box into which the flexible wiring board 9 can be inserted. Specifically, as shown in FIGS. 4(*a*) and 4(*b*), the insertion guide 8*a* has a substantially box-like shape with side walls 8*a*1, 8*a*2 standing on opposite side surfaces of the flexible wiring board 9, an upper cover 8*a*3 covering a top surface of the flexible wiring board 9, and a lower cover 8*a*4 covering a bottom surface of the flexible wiring board 9. The insertion guide 8*a* has an opening 8*a*5 on the opposite side of the electrodes 9*a*, 9*b* (when represented with a coordinate axis, the positive direction side on the y-axis shown in FIG. 4(*b*)), and an opening 8*a*6 on the side of the electrodes 9*a*, 9*b* (when represented with a coordinate axis, the negative direction side on the y-axis shown in FIG. 4(*b*)). The side walls 8*a*1, 8*a*2 extend to the side of the electrodes 9*a*, 9*b* (when represented with a coordinate axis, the negative direction side on the y-axis shown in FIG. 4(*b*)) further than the upper cover 8*a*3 and the lower cover 8*a*4 so as to cover both ends of the flexible wiring board 9 in the width direction. The insertion guide 8*a* thus has a shape of a hollow box inside it, allowing exposure of the electrodes 9*a*, 9*b* when the flexible wiring board 9 is placed inside the insertion guide 8*a*. The insertion guide 8*a* has a width length (the length in the right-left direction in FIG. 4(*a*)) formed slightly shorter than an opening width of an insertion portion 51 of a housing 5. A height of the side walls 8*a*1, 8*a*2 is configured to be slightly shorter than the height of the insertion portion 51 so that the mating connection unit 4 can be inserted into the opening of the insertion portion 51. Tips of the side walls 8*a*1, 8*a*2 on the insertion side are tapered in order to help insertion into the connector 3. The insertion guide 8*a* thereby facilitates positioning in the width direction of the insertion portion 51 (when represented with a coordinate axis, the positive-negative direction on the x-axis shown in FIG. 4(*a*)) and in the vertical direction (the height direction; when represented with a coordinate axis, the positive-negative direction on the z-axis shown in FIG. 4(*b*)), and facilitates insertion of the mating connection unit 4 into the connector 3.

The mating insertion portion 8 has two tabs 8*b* on the upper cover 8*a*3 for fitting into (primary locking) lock holes 5*cl* formed in the housing 5 of the connector 3, as shown in FIG. 2. Fitting of the tabs 8*b* into the lock holes 5*cl* prevents misalignment of fitting between the connector 3 and the mating connection unit 4. The mating insertion portion 8 has the secondary lock mechanism 8*d* on the upper cover 8*a*3 for further ensuring the fitting between the connector 3 and the mating connection unit 4. Assuming that the printed circuit board 1 is at rest, the mating connection unit 4 is fitted with the connector 3 by moving the mating connection unit 4 in a direction toward the connector 3 of the printed circuit board 1 (the same direction as an insertion direction P, discussed later) and inserting the mating insertion portion 8 of the mating connection unit 4 into the insertion portion 51 of the connector 3, as shown in FIG. 4(*b*). The side walls 8*a*1, 8*a*2 are each provided with a positioning portion 8*e* (FIG. 2(*a*)) near the end opposite the tapered end. The positioning portion 8*e* limits insertion movement of the flexible wiring board 9 into the connector 3 such that the flexible wiring board 9 cannot be moved to a base portion 52 (FIG. 4(*b*)) side more than defined. This prevents breakage of terminals 6 in the connector 3 and the flexible wiring board 9, for example. After fitting of the tabs 8*b* and the lock holes 5*cl* is completed, the secondary lock mechanism 8*d* is pushed in the insertion direction P, causing portions of projections (not shown) provided at the opposite ends of the secondary lock mechanism 8*d* to slide under the lever 8*c*. This prohibits the lever 8*c* from being pushed downward (to the lower cover 8*a*4 side) and hence it becomes impossible to release the primary locking, completing secondary lock (secondary locking). This motion can make the user aware that the connector 3 has been connected with the mating connection unit 4 reliably, not only functionally but visually and perceptually. The upper cover 8*a*3 has the lever 8*c* (FIG. 2) provided contiguously with the tabs 8*b*. By moving the secondary lock mechanism 8*d* in a reverse insertion direction P', which will be discussed later, the secondary locking is released and the lever 8*c* can move downward (to the lower cover 8*a*4 side). When the lever 8*c* is pushed downward, the tabs 8*b* move down correspondingly, releasing the fitting between the tabs 8*b* and the lock holes 5*cl* (the primary locking).

(Printed Circuit Board 1)

Figure 5:
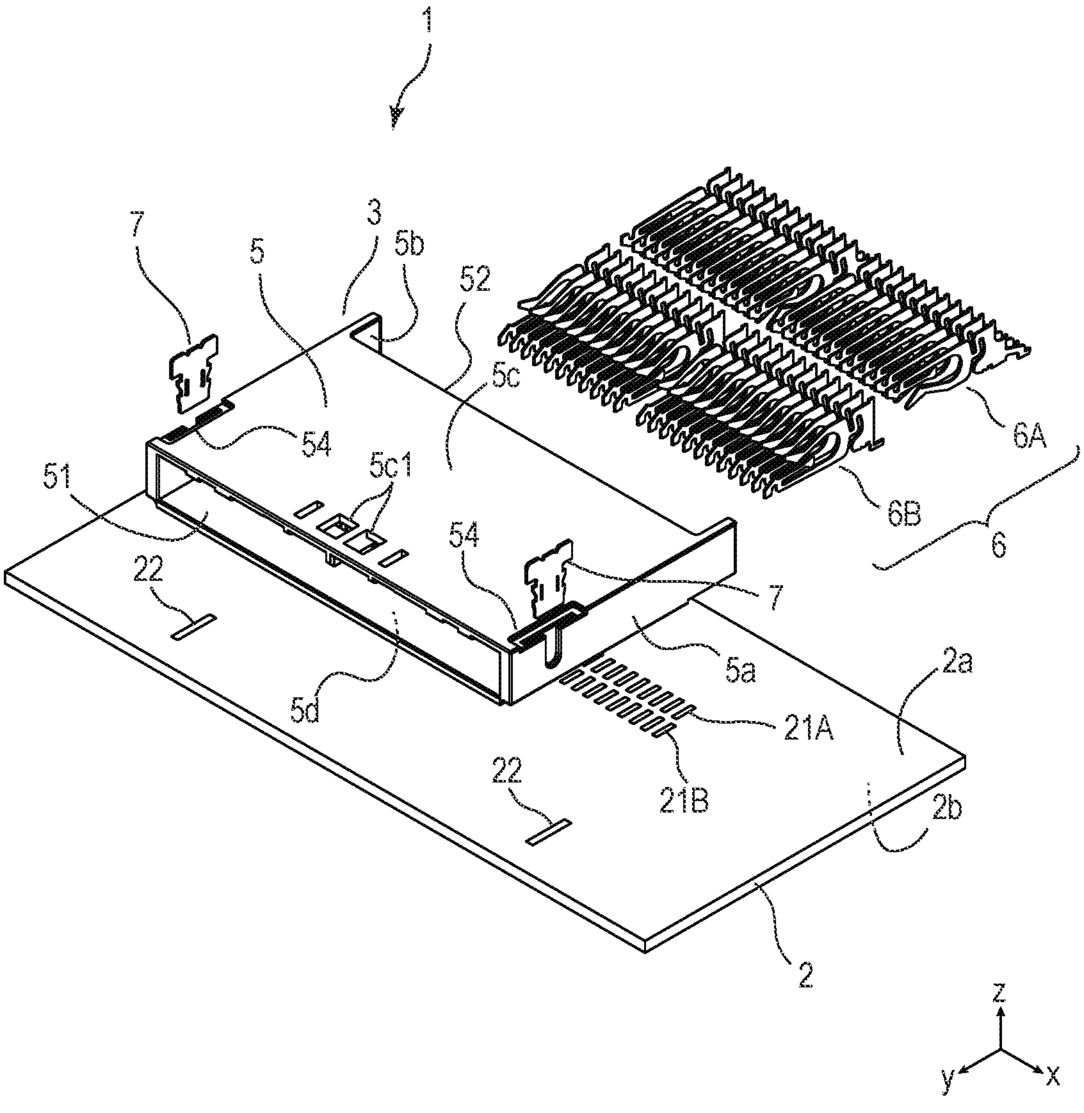
FIG. 5 is an exploded perspective view of the printed circuit board 1.

FIG. 5 is an exploded perspective view of the printed circuit board 1. As shown in FIG. 5, the main components of the printed circuit board 1 are a printed wiring board 2 and the connector 3 into which the mating connection unit 4 can be inserted.

(Printed Wiring Board 2)

The printed wiring board 2 is made of glass epoxy resin as base material, for example, and on an upper surface 2*a* thereof, multiple electrodes 21A, 21B are arrayed in a longitudinal direction of the printed wiring board 2 (the direction of width length W3 in FIG. 4; hereinafter also referred to as "width direction W") so that electrical connection (hereinafter also referred to as "continuity") can be established with the electrodes 9*a*, 9*b* on the mating connection unit 4. The multiple electrodes 21A and electrodes 21B are arranged offset (shifted) in the width direction W from the positions at which they are opposite each other. This provides a staggered arrangement of the multiple electrodes 21A and electrodes 21B on the upper surface 2*a* of the printed wiring board 2. The printed wiring board 2 has two holes 22 into which fasteners 7 can be inserted through holes 54 in the connector 3.

(Connector 3)

The main components of the connector 3 are the housing 5 and the multiple terminals 6, as shown in FIG. 5.

The housing 5 is a molded piece made of thermoplastic resin, for example, ABS, as base material, and is mounted on the upper surface 2*a* of the printed wiring board 2 in the present embodiment. The housing 5 of the present embodiment has side walls 5*a*, 5*b*, which are standing walls, and an upper surface 5*c* and a lower surface 5*d* covering portions of the side walls 5*a*, 5*b*, and forms a shape of a hollow box having the insertion portion 51, which is on the front side in FIG. 5 (when represented with a coordinate axis, the positive direction side on the y-axis shown in FIG. 5(*a*)), and the base portion 52, which is on the back side (when represented with a coordinate axis, the negative direction side on the y-axis shown in FIG. 5(*a*)). The insertion portion 51 has a rectangular opening formed in one end of the housing 5 and having a width length W3 (FIG. 4(*a*)), into which the mating connection unit 4 can be inserted. The base portion 52 has a rectangular opening with the same width length W3 as that of the opening in the insertion portion 51 at a location separated by a length D3 from the opening of the insertion portion 51 in the direction of inserting the mating connection unit 4, or when represented with a coordinate axis, in the negative direction on the y-axis shown in FIG. 4(*b*) (hereinafter also referred to as "insertion direction P"). The housing 5 has multiple terminals 6 that are inserted in its hollow box-shaped interior, the terminals 6 being press-fit and fixed to the lower surface 5*d* of the housing 5. Details of the terminals 6 will be discussed later.

The housing 5 has two lock holes 5*cl* into which the tabs 8*b* of the mating insertion portion 8 are fitted, in the upper surface 5*c* near the center on the insertion portion 51 side. As shown in FIG. 4, the housing 5 has multiple guide portions 53 in the hollow interior of the housing 5, the guide portions 53 being provided so as to extend (hereinafter also referred just as "to extend") in the direction from the base portion 52 toward the insertion portion 51, or when represented with a coordinate axis, in the positive direction on the y-axis shown in FIG. 4(*b*) (hereinafter also referred to as "reverse insertion direction P'"). FIG. 6 is a diagram for describing a positional relationship between the terminals 6 and guide portions 53, where FIG. 6(*a*) is an enlarged view of region V in FIG. 4(*b*), and FIG. 6(*b*) is a schematic diagram as seen from the insertion portion 51 side for describing arrangement in width direction W. For facilitating understanding of the structure, one terminal 6 and one guide portion 53 are shown in FIG. 6(*a*). FIG. 6(*b*) shows two terminals 6 (terminals 6A, 6B), and three guide portions 53 running in the vertical direction (when represented with a coordinate axis, in the positive-negative direction on the z-axis shown in FIG. 6(*b*)). In FIG. 6(*b*), the guide portions 53 are hatched in order to distinguish between the terminals 6 and the guide portions 53. As shown in FIG. 6, the guide portions 53 are thin plates and stand with their lengths horizontal. Each guide portion 53 is provided with a notch 53A into which the mating connection unit 4 can be inserted. The multiple guide portions 53 each have a similar configuration and are arranged in the width direction W (the right-left direction in FIG. 6(*b*)) within the housing 5 such that the guide portions 53 and the terminals 6 alternate as shown in FIG. 6(*b*).

(Terminals 6)

Figure 7:
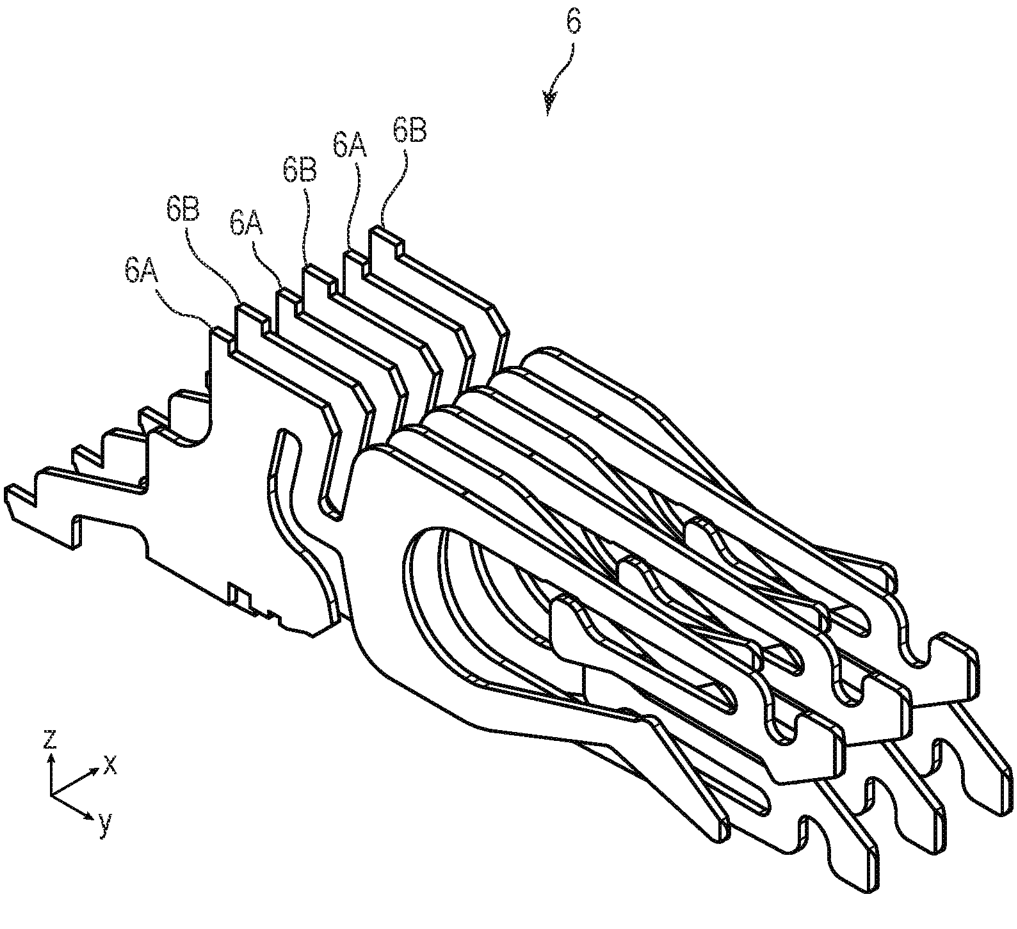
FIG. 7 is a perspective view of terminals 6.
Figure 8A:
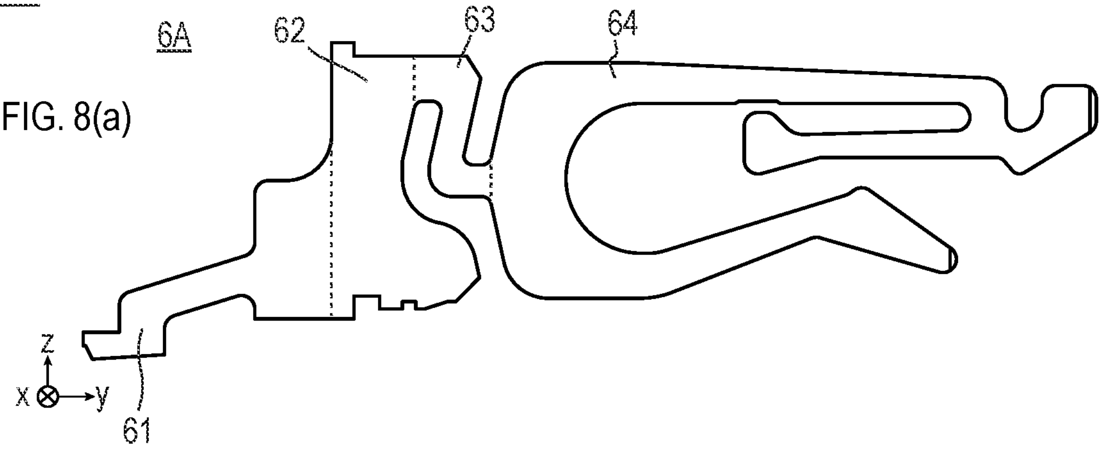
FIGS. 8(*a*), 8(*b*), 8(*c*), 8(*d*), 8(*e*) and 8(*f*) are diagrams defining formal regions for describing the configuration of a terminal 6A, where FIG. 8(*a*) shows an element constituting the entire terminal 6A, FIG. 8(*b*) shows an element constituting a contacting portion 61, FIG. 8(*c*) shows an element constituting a fixation portion 62, FIG. 8(*d*) shows an element constituting an extension portion 63, FIG. 8(*e*)
Figure 8B:
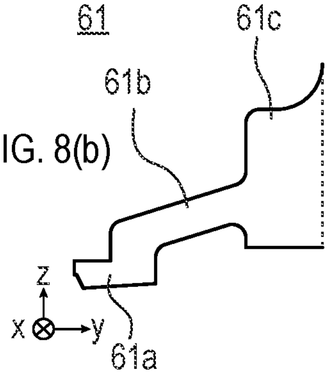
Figure 8C:
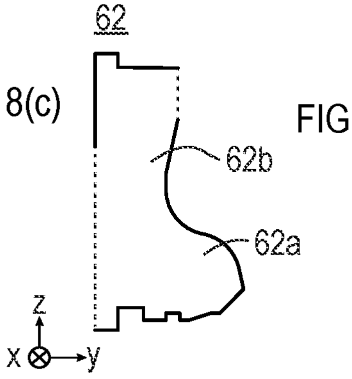
Figure 8D:
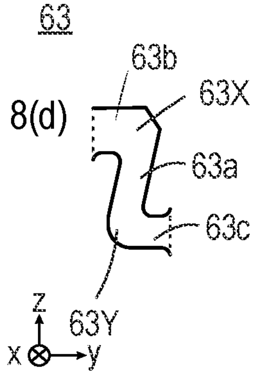
Figure 8E:
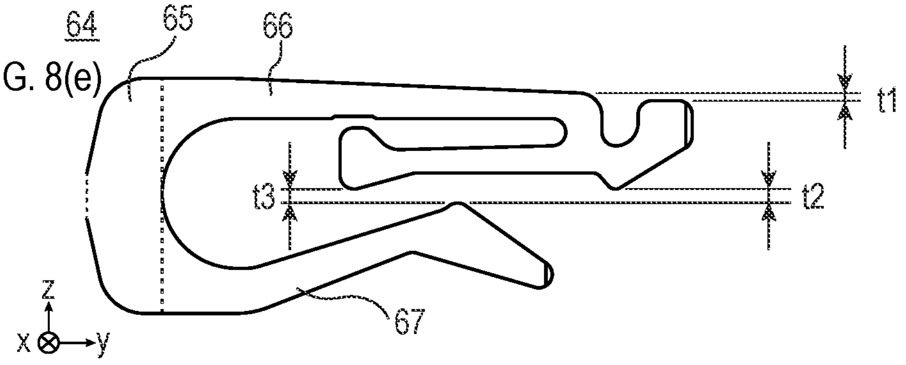
Figure 8F:
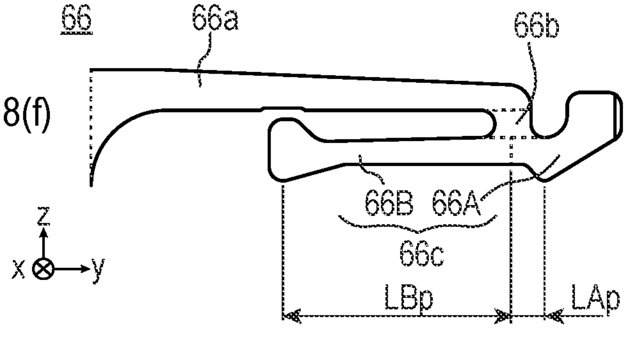

The multiple terminals 6 are made up of multiple terminals 6A arrayed in the width direction W of the connector 3 and establishing continuity with the electrodes 21A, and multiple terminals 6B arrayed in the width direction W of the connector 3 and establishing continuity with the electrodes 21B, as shown in FIG. 5. FIG. 7 is a perspective view of the terminals 6. In FIG. 7, only six terminals are illustrated as the multiple terminals 6 and the other terminals 6 are not shown. The connector 3 has the same number of terminals 6 as the total number of the electrodes 21A, 21B. The multiple terminals 6 are the terminals 6A as first terminals and the terminals 6B as second terminals, alternately arranged in the width direction W of the housing 5.

(Terminals 6A)

FIG. 8 is a diagram defining formal regions for describing the configuration of the terminal 6A, where FIG. 8(*a*) shows an element constituting the entire terminal 6A, FIG. 8(*b*) shows an element constituting a contacting portion 61, FIG. 8(*c*) shows an element constituting a fixation portion 62, FIG. 8(*d*) shows an element constituting an extension portion 63, FIG. 8(*e*) shows an element constituting a connection portion 64, and FIG. 8(*f*) shows an element constituting a first arm 66. FIG. 9 is a diagram for describing the terminal 6A, where FIG. 9(*a*) is a perspective view and FIG. 9(*b*) is a plan view. The terminal 6A is formed of the contacting portion 61, the fixation portion 62, the extension portion 63, and the connection portion 64 as shown in FIG. 8(*a*), and has a shape of a thin plate formed in one piece by punching, for example, with these portions contiguous with one another. The terminal 6A is made of electrically conductive material, such as copper, as base material.

The contacting portion 61 is formed of a joining portion 61*a* to be electrically joined to an electrode 21A on the printed wiring board 2, a leg 61*b* which extends from one end of the joining portion 61*a* upward in the reverse insertion direction P' (the rightward direction in FIG. 8(*b*)) and adjusts the length of the contacting portion 61, and a contacting end 61*c* extending from the leg 61*b* in the reverse insertion direction P' while having a predefined height greater than the width length of extension of the leg 61*b*, as shown in FIG. 8(*b*).

The fixation portion 62 is a thin plate contiguous with the contacting portion 61, as shown in FIG. 8(*c*), and fixes the terminal 6 to the housing 5. The fixation portion 62 is formed of a fixing base portion 62*a* and a fixation extending portion 62*b*. The fixing base portion 62*a* has a shape of substantially square plate, is contiguous with the contacting end 61*c* on the insertion direction P side (the left side in FIG. 8(*c*)), and has a fixed end 62*al* (see FIG. 9(*b*)) to be press-fit and fixed to the base portion 52 of the housing 5 at a lower end (when represented with a coordinate axis, the end in the negative direction on the z-axis shown by FIG. 8(*c*)). The fixation extending portion 62*b* forms a substantially rectangular plate extending from the upper surface 5*c* side of the fixing base portion 62*a* to the upper surface 5*c* side and having a width shorter than the width of the fixing base portion 62*a*.

The extension portion 63 is a thin plate contiguous with the fixation portion 62 as shown in FIG. 8(*d*), and adjusts application of pressure to the connection portion 64 caused by insertion of the flexible wiring board 9. The extension portion 63 has an extension base portion 63*a*, and extension ends 63*b*, 63*c* provided at opposite ends of the extension base portion 63*a*. The extension portion 63 extends in the reverse insertion direction P', with the extension end 63*b* contiguous with one end of the fixation extending portion 62*b* of the fixation portion 62. The extension base portion 63*a* extends from the other end of the extension end 63*b* over a predefined length in the direction of the lower surface 5*d* (the downward direction in FIG. 8(*d*)). The extension end 63*c* extends from the end of the extension base portion 63*a* on the lower surface 5*d* side in the reverse insertion direction P' over a predefined length. In the present embodiment, an area of the extension portion 63 in which the direction of extension changes due to the extension base portion 63*a* and the extension end 63*b* will be called a "bent portion 63X". Likewise, an area in which the direction of extension changes due to the extension base portion 63*a* and the extension end 63*c* will be called a "bent portion 63Y". The extension portion 63 is contiguous with the connection portion 64. The extension portion 63 is displaced as follows when the flexible wiring board 9 of the mating connection unit 4 is inserted into the connection portion 64. For a force in the insertion direction P, the extension base portion 63*a* rotates about the bent portion 63X as a fulcrum (is displaced clockwise in FIG. 9(*b*)), and in conjunction with this movement, the bent portion 63Y and the extension end 63*c* are displaced in the insertion direction P (the direction toward the fixation portion 62) and the connection portion 64 is also displaced accordingly. For a force in a direction that intersects substantially orthogonally both the insertion direction P and the width direction W (the vertical direction in FIG. 9(*b*); hereinafter also referred to as "intersection direction I"), the extension end 63*c* rotates about the bent portion 63Y as the fulcrum. Specifically, when the force in the intersection direction I is to the upper side (the upper surface 5*c* side), displacement occurs counterclockwise in FIG. 9(*b*), and when the force in the intersection direction I is to the lower side (the lower surface 5*d* side), displacement occurs clockwise. This causes displacement of the extension end 63*c* in the intersection direction I. In conjunction with the displacement of the extension end 63*c*, the connection portion 64 is also displaced. Specifically, the extension portion 63 has a first bent portion (the bent portion 63X) that allows at least part of the extension portion 63 to be displaced in the direction toward the fixation portion 62, and a second bent portion (the bent portion 63Y) that allows at least part of the extension portion 63 to be displaced in the intersection direction I. The terminals 6 of the present disclosure may also be configured with either one bent portion of the bent portion 63X and the bent portion 63Y.

Thus, the extension portion 63 adjusts application of pressure to the connection portion 64 by the flexible wiring board 9 via spring forces caused by the bent portions 63X, 63Y. The bent portions 63X, 63Y enable handling of contact position misalignment and angle mismatch due to, for example, deviation associated with press-fitting position of the terminals 6 to the housing 5 or manufacture errors of terminals, and can reduce insertion force in insertion of the flexible wiring board 9 into the connection portion 64, contributing to improved reliability by prevention of breakage.

The connection portion 64 has a thin plate shape with one end being contiguous with the extension end 63*c* of the extension portion 63 and the other end extending in the reverse insertion direction P'. As discussed later, the connection portion 64 is configured to be able to establish continuity with the mating connection unit 4 by insertion of the mating connection unit 4 into the connector 3.

(Connection Portion 64)

The connection portion 64 is formed of a connecting base portion 65, a first arm 66, and a second arm 67 as shown in FIG. 8(*e*).

The connecting base portion 65 extends in the intersection direction I from the extension end 63*c* of the extension portion 63 and forms a substantially rectangular plate.

The first arm 66 is formed of a main arm 66*a*, a support portion 66*b*, and a sub-arm 66*c* as shown in FIG. 8(*f*). The main arm 66*a* linearly extends in the reverse insertion direction P' from the upper surface 5*c* side in the intersection direction I of the connecting base portion 65, and forms an elongate plate. The main arm 66*a* is shaped to taper as it goes in the extension direction. The support portion 66*b* extends from a predefined location on the main arm 66*a* at the extension side (although, in FIG. 8(*f*), it is an end of the main arm 66*a*, it is not limited to the end) to the second arm 67 side in the intersection direction I (the lower surface 5*d* side) for a very small length compared to the extension length of the first arm 66, and serves as the fulcrum for seesaw behaviors of the sub-arm 66*c*. The sub-arm 66*c* is formed of a first sub-arm 66A extending from the end of the support portion 66*b* on the extension side to the reverse insertion direction P' side, and a second sub-arm 66B extending from the end of the support portion 66*b* on the extension side in the insertion direction P, as shown in FIG. 8(*f*). A length of extension LA in the first sub-arm 66A (FIG. 9) is set shorter than a length of extension LB in the second sub-arm 66B. As a result of this, the second sub-arm 66B has a lower spring constant than that of the first sub-arm 66A, such that the amount of displacement will be larger in the second sub-arm 66B than in the first sub-arm 66A when the flexible wiring board 9 is inserted. This enables reduced insertion force for inserting the flexible wiring board 9 into the mating connection unit 4.

The first sub-arm 66A has a first contact portion 66Ap that protrudes to the second arm 67 side (the lower surface 5*d* side) in the intersection direction I, as shown in FIG. 9. The first contact portion 66Ap is configured to be electrically connectable with an electrode on the flexible wiring board 9 by insertion of the mating connection unit 4 into the connector 3. The first sub-arm 66A has a first protrusion portion 66Ao that protrudes from the end on the insertion portion 51 side to the main arm 66*a* side (the upper surface 5*c* side) in the intersection direction I. The first protrusion portion 66Ao at least in part faces the neighboring guide portions 53 and overlaps them in the width direction W at a predefined gap (FIG. 6). This limits movement of the first protrusion portion 66Ao in the width direction W. A tip position of the end of the first protrusion portion 66Ao on the protrusion side is located on the sub-arm 66*c* side (the lower surface 5*d* side) at a length t1 with respect to the position of the main arm 66*a* on the upper surface 5*c* side in the intersection direction I (FIG. 8(*e*)). Since the first arm 66 has spring property, it moves in the intersection direction I upon insertion of the flexible wiring board 9. When a force in the upward direction (the direction of the upper surface 5*c*) occurs on the first arm 66, the first arm 66 moves in the upward direction (the direction of the upper surface 5*c*). The main arm 66*a* being located on the upper surface 5*c* side at the length t1 relative to the first protrusion portion 66Ao serves as a clearance for enabling seesaw movements of the sub-arm 66*c*. The end of the first sub-arm 66A on the extension side has a slope portion 66As as a second slope portion, which is inclined to the main arm 66*a* side (the upper surface 5*c* side) in the intersection direction I as it goes in the reverse insertion direction P' starting at the first contact portion 66Ap.

The second sub-arm 66B has a second contact portion 66Bp that protrudes to the second arm 67 side (the lower surface 5*d* side) in the intersection direction I, as shown in FIG. 9. The second contact portion 66Bp is configured to be electrically connectable with an electrode on the flexible wiring board 9 by insertion of the mating connection unit 4 into the connector 3. The second sub-arm 66B has a second protrusion portion 66Bo that protrudes from the end on the extension side (the base portion 52 side) toward the main arm 66*a* (the upper surface 5*c* side). The second protrusion portion 66Bo at least in part faces the neighboring guide portions 53 and overlaps them in the width direction W at a predefined gap (FIG. 6). This limits movement of the second protrusion portion 66Bo in the width direction W. The second protrusion portion 66Bo and the main arm 66*a* are located at a predefined distance from each other in the intersection direction I. The main arm 66*a* is provided with a recess 66H at a location opposite the second protrusion portion 66Bo in order to avoid contact with the second protrusion portion 66Bo, as shown in FIG. 9. The end of the second sub-arm 66B on the extension side (the base portion 52 side) has a slope portion 66Bs as a third slope portion, which is inclined to the main arm 66*a* side (the upper surface 5*c* side) in the intersection direction I as it goes in the reverse insertion direction P' starting at the second contact portion 66Bp.

The second arm 67 extends from the lower side in the intersection direction I of the connecting base portion 65 (the lower surface 5*d* side) in the reverse insertion direction P' and forms an elongate plate. The second arm 67 has a tapered shape and extends in the reverse insertion direction P' up to some midpoint in the extension direction and, on the further extension side, extends such that its tip is inclined to the upper surface 5*c* side as it extends in the reverse insertion direction P'. This increases the spring constant of the second arm 67. The first arm 66 has a seesaw structure with the linear main arm 66*a*, the support portion 66*b*, and the sub-arm 66*c*, and the spring constant of the first arm 66 is set lower than that of the second arm 67. The connecting base portion 65 is contiguous with the extension end 63*c* at its end on the extension end 63*c* side (the left side in FIG. 9(*b*)). The position where they are contiguous is a predefined location between the end on the upper side (the upper surface 5*c* side) and the end on the lower side (the lower surface 5*d* side) of the connecting base portion 65 in the intersection direction I. Although, in FIG. 9, this position is provided in a central portion, this is not limitative.

The second arm 67 has a pressing portion 67*p* on the extension side as shown in FIG. 9(*b*). The pressing portion 67*p* protrudes toward a predefined location between the first contact portion 66Ap and the second contact portion 66Bp in the sub-arm 66*c*. The pressing portion 67*p* in the present embodiment is located opposite some portion (G) of the second sub-arm 66B. Preferably, the position of this G is determined so that a moment acting on the first contact portion 66Ap and a moment acting on the second contact portion 66Bp are balanced, in consideration of the seesaw structure formed by the sub-arm 66*c* and the like, lengths LAp and LBp (FIG. 8(*f*)), discussed later, and the position of the pressing portion 67*p* as well. With this positional relationship, even if prying occurs with the flexible wiring board 9 to cause a force acting to separate the first contact portion 66Ap and an electrode on the flexible wiring board 9, a pushing force will act between the second contact portion 66Bp and the electrode on the flexible wiring board 9 (contact pressure will be ensured), keeping a good electrical contact between the terminal 6 and the flexible wiring board 9. The position of G can be set at a location on the second contact portion 66Bp side, rather than the center location between the first contact portion 66Ap and the second contact portion 66Bp, for example. The pressing portion 67*p* presses against the flexible wiring board 9 of the inserted mating connection unit 4. The end of the second arm 67 on the insertion portion 51 side (the side on which the second arm 67 extends) has a slope portion 67*s* as a first slope portion, which is inclined away from the sub-arm 66*c* (to the lower surface 5*d* side) as it goes to the insertion portion 51 side (to the reverse insertion direction P' side) starting at the pressing portion 67*p*. The end of the second arm 67 on the insertion portion 51 side at least in part faces the neighboring guide portions 53 and overlaps them in the width direction W at a predefined gap (FIG. 6). This limits movement of the end of the second arm 67 on the insertion portion 51 side in the width direction W. The pressing portion 67*p* and the first contact portion 66Ap are at a length t2 from one another in the intersection direction I, and the pressing portion 67*p* and the second contact portion 66Bp are at a length t3 from one another in the intersection direction I (FIG. 8(*e*)). In the present embodiment, t2 and t3 are set slightly smaller than the thickness of the flexible wiring board 9 in order to enable insertion of the flexible wiring board 9 and to appropriately secure pressing force with the pressing portion 67*p* and contact force of the first contact portion 66Ap and the second contact portion 66Bp with the flexible wiring board 9. However, t2 and t3 are not limited to it and may be set to other lengths for the purpose of increasing the contact pressure with the flexible wiring board 9. In this case, t2 and t3 may be designed to be 0 (zero) or negative (that is, in FIG. 8(*e*), the position of the pressing portion 67*p* in the intersection direction I is on the upper surface 5*c* side relative to the first contact portion 66Ap or the second contact portion 66Bp), for example.

(Terminal 6B)

FIG. 10 is a diagram for describing the terminal 6B, where FIG. 10(*a*) is a perspective view and FIG. 10(*b*) is a plan view. The terminal 6B is formed of a contacting portion 61B, the fixation portion 62, the extension portion 63, and a connection portion 64B as shown in FIG. 10.

The contacting portion 61B does not have portions corresponding to the leg 61*b* and the contacting end 61*c* of the contacting portion 61 (FIG. 8(*b*)); it is formed in a shape similar to the joining portion 61*a* and is electrically joined with an electrode 21B on the printed wiring board 2.

The fixation portion 62 and the extension portion 63 of the terminal 6B have the same shapes as the fixation portion 62 and the extension portion 63 of the terminal 6A.

The connection portion 64B has the same configuration of that of the connection portion 64 of the terminal 6A. However, the connection portion 64B has the same shape as the connection portion 64 of the terminal 6A but inverted (rotated 180 degrees) about the insertion direction P, and is contiguous with the extension portion 63 of the terminal 6B. Due to this inversion, the terminal 6B is configured with the pressing portion 67*p* on the upper surface 5*c* side and the first contact portion 66Ap and the second contact portion 66Bp on the lower surface 5*d* side.

When the terminal 6 is inserted into the housing 5 and press-fit and fixed, assembly of the connector 3 is completed. In the connector 3, at the terminals 6A or the first terminals, the respective first contact portions 66Ap are arrayed at positions that overlap in the width direction W, the respective second contact portions 66Bp are arrayed at positions that overlap in the width direction W, and the respective pressing portions 67*p* are arrayed at positions that overlap in the width direction W. In the connector 3, at the terminals 6B or the second terminals, the respective first contact portions 66Ap are arrayed at positions that overlap in the width direction W, the respective second contact portions 66Bp are arrayed at positions that overlap in the width direction W, and the respective pressing portions 67*p* are arrayed at positions that overlap in the width direction W.

(Mounting the Connector 3 onto the Printed Wiring Board 2)

A process of mounting the connector 3 to the printed wiring board 2 to obtain the printed circuit board 1 can be performed in the following steps, for example (see FIG. 5). Solder paste is applied to the electrodes 21A, 21B on the printed wiring board 2. The terminals 6A of the connector 3 and the electrodes 21A on the printed wiring board 2 are placed opposite each other, the terminals 6B of the connector 3 and the electrodes 21B on the printed wiring board 2 are placed opposite each other, and the holes 54 in the housing 5 are aligned with the holes 22 in the printed wiring board 2. The fasteners 7 are inserted from above (through the upper surface 5*c*) to fix the printed wiring board 2 and the connector 3 to each other. In this state, they are subjected to heating treatment in a reflow furnace, for example, and electrical joining between the terminal 6 and the printed wiring board 2 is completed, providing the printed circuit board 1.

(Inserting the Mating Connection Unit 4 into the Connector 3)

FIG. 11 shows a situation where the mating connection unit 4 is inserted in FIG. 6(*a*). For facilitating understanding, the illustration of FIG. 11 only adds a representation of the flexible wiring board 9 to FIG. 6(*a*). The description below is for the case where the printed circuit board 1 with the connector 3 is fixed (is at rest) and the mating connection unit 4 is moved in the insertion direction P to be inserted into it (the case shown in FIG. 4(*b*)). As already mentioned, the height of the side wall 8*al* of the mating insertion portion 8 is set slightly smaller than the height of the insertion portion 51, and the tip of the flexible wiring board 9 is inserted so as to be guided to a location exactly between the first contact portion 66Ap and the pressing portion 67*p* in the intersection direction I. If any portion of the tip of the flexible wiring board 9 is inserted slightly to the upper side (the upper surface 5*c* side) or to the lower side (the lower surface 5*d* side) relative to between the first contact portion 66Ap and the pressing portion 67*p* in the intersection direction I, the terminals 6A, 6B would behave as described below because the terminals 6A, 6B have slope portions (the slope portion 66As, the slope portion 67*s*, the slope portion 66Bs). In a case where the tip of the flexible wiring board 9 makes contact with the slope portions 66As, if the tip of the flexible wiring board 9 makes contact with the terminals 6A, the first arm 66 would move to the upper side (the upper surface 5*c* side), and if the tip of the flexible wiring board 9 makes contact with the terminals 6B, the first arm 66 would move to the lower side (the lower surface 5*d* side). At the same time, the sub-arm 66*c* tilts so that the second contact portion 66Bp moves away from the main arm 66*a* (in other words, the sub-arm 66*c* tilts so that the first contact portion 66Ap comes closer to the main arm 66*a*). In a case where the flexible wiring board 9 is further inserted to the insertion direction P side and the tip of the flexible wiring board 9 makes contact with the slope portions 67*s*, if the tip of the flexible wiring board 9 makes contact with the terminals 6A, the second arm 67 would move to the lower side (the lower surface 5*d* side), and if the tip of the flexible wiring board 9 makes contact with the terminals 6B, the second arm 67 would move to the upper side (the upper surface 5*c* side). In a case where the flexible wiring board 9 is further inserted to the insertion direction P side and the tip of the flexible wiring board 9 makes contact with the slope portions 66Bs, the sub-arm 66*c* tilts so that the second contact portion 66Bp comes closer to the main arm 66*a* (in other words, the sub-arm 66*c* tilts so that the first contact portion 66Ap moves away from the main arm 66*a*). That is to say, the structure is such that the terminals 6 are less prone to buckling during insertion of the flexible wiring board 9 into the terminals 6.

Through the movements described above, the tip of the flexible wiring board 9 is stably inserted near the connecting base portion 65 as shown in FIG. 11. Under the locking mechanism between the lock holes 5*cl* in the housing 5 and the tabs 8*b* of the mating insertion portion 8 and constraint of movement in the insertion direction P by the positioning portion 8*e*, insertion movement of the mating connection unit 4 into the connector 3 to the predefined location is completed. By moving the secondary lock mechanism 8*d* in the insertion direction P, secondary locking is activated, completing the insertion of the mating connection unit 4.

In the connector 3 according to the present embodiment, the mating connection unit 4 is pressed by the pressing portion 67*p* when the mating connection unit 4 is inserted between the sub-arm 66*c* and the second arm 67. As a result, the electrodes 9*a*, 9*b* make contact with the opposing first contact portions 66Ap and second contact portions 66Bp, respectively, producing a reaction to the pressing force. As to the flexible wiring board 9, when focusing on one wire and one electrode, for example, a wire 9A and an electrode 9*a*, the flexible wiring board 9 takes the form of a beam supported at both ends, with one surface supported by the first contact portion 66Ap and the second contact portion 66Bp and the other surface pressed by the pressing portion 67*p*. That is, since the pressing portion 67*p* is not provided at a location opposite the first contact portion 66Ap or the second contact portion 66Bp, the pressing force of the pressing portion 67*p* will not be concentrated at either one of the contact portions. Thus, it is possible to reduce insertion force for the flexible wiring board 9. This can reduce damage to the flexible wiring board 9 and increase the reliability of the connection between the first contact portions 66Ap and the electrodes 9*a*, 9*b* and the connection between the second contact portions 66Bp and the electrodes 9*a*, 9*b*.

The first arm 66 has a so-called seesaw structure formed by the support portion 66*b* and the sub-arm 66*c*, and the spring constant of the first arm 66 is set lower than that of the second arm 67. As a result of this, larger displacement will occur to the first arm 66 side (the sub-arm 66*c* side) than to the second arm 67 side upon insertion of the flexible wiring board 9, and this seesaw structure can also enable reduction in insertion force for the flexible wiring board 9 and prevent damage to the flexible wiring board 9.

Application of a seesaw structure enhances the reliability of connections. Specifically, a moment that is generated by the pressing force on the first contact portion 66Ap and the length LAp from the support portion 66*b* to the first contact portion 66Ap (FIG. 8(*f*)) is balanced with a moment that is generated by the pressing force on the second contact portion 66Bp and the length LBp from the support portion 66*b* to the second contact portion 66Bp (FIG. 8(*f*)). In this case, even if it happens that continuity with one of the first contact portion 66Ap and the second contact portion 66Bp is insufficient, continuity via the other contact portion is possible, and thus improved reliability of connection with the mating connection unit 4 is expected.

By ensuring an adequate pressing force of the pressing portion 67*p* with the structure of the second arm 67, reliability of connection with the first contact portion 66Ap and the second contact portion 66Bp can be ensured. Therefore, there is no need to provide a separate component for ensuring pressing force in order to ensure the connection with the electrodes 9*a*, 9*b* of the flexible wiring board 9.

Due to alternate arrangement of the terminals 6A or the first terminals and the terminals 6B or the second terminals, the direction of pressing the flexible wiring board 9 alternates between being upward and downward, as seen from the width direction W. Thus, good connections are maintained even when a force such as tilting acts on the flexible wiring board 9.

An embodiment of the present disclosure has been described above. With the configurations above, the connection portion 64 of each of the multiple terminals 6 is configured such that when the mating connection unit 4 is inserted between the respective first arms 66 and second arms 67 via the insertion portion 51, the pressing portion 67*p* presses against the mating connection unit 4 and at least either contact portion of the first contact portion 66Ap and the second contact portion 66Bp establishes continuity with the mating connection unit 4. This enables stable connection.

Modification

FIG. 12 is a perspective view of multiple terminals 6' uniformly configured in the same shape. Instead of the multiple terminals 6 composed of the terminals 6A and the terminals 6B shown in FIG. 7, the connector 3 in the present embodiment may use multiple terminals 6' composed only of either type of terminals as shown in FIG. 12 (in FIG. 12, the terminals 6B). In this case, for the mating connection unit 4, a mating connection unit 4 carrying the wires 9B and the electrodes 9*b* from the wires 9A, 9B and the electrodes 9*a*, 9*b* in FIG. 3, for example, is prepared.

That is, a mating connection unit 4 including a flexible wiring board (flexible wiring board 9', not illustrated) with wires and electrodes only on one surface is prepared. In this case, due to a moment balancing effect similar to that for a beam supported at both ends described above resulting from application of pressure to the mating connection unit 4 by the pressing portion 67*p* with the first contact portion 66Ap and the second contact portion 66Bp serving as fulcrums, a reaction to a pressing force sufficient for continuity with at least one of the first contact portion 66Ap and the second contact portion 66Bp will also occur on the mating connection unit 4, enabling continuity with the mating connection unit 4. In this case, even if it happens that continuity with one of the first contact portion 66Ap and the second contact portion 66Bp is insufficient, continuity via the other contact portion is possible, and thus improved reliability of connection with the mating connection unit 4 is expected.

An embodiment and a modification of the present disclosure have been described above. While the number of terminals 6 in the present embodiment was described for a case where the number of terminals 6A and the number of terminals 6B are the same (23 each), this is merely an example and the total number of terminals 6 may be varied in relation to the wires on the flexible wiring board 9. The number of terminals 6A and the number of terminals 6B need not be the same; they may be adjusted as appropriate in accordance with the layout of the flexible wiring board 9. Although the present embodiment was described for a case where the flexible wiring board 9 is wired to the printed circuit board 1 substantially horizontally, if the flexible wiring board 9 is wired to the printed circuit board 1 substantially vertically, the housing 5 may be mounted on the printed circuit board 1 substantially vertically. In addition, it goes without saying that the printed circuit board and the mating connection unit as described in the present embodiment can be modified as appropriate without departing from the spirit of the present disclosure.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A connector comprising:

a housing including an insertion portion with a predefined width into which a mating connection unit having a plurality of mating terminals arrayed thereon can be inserted, and a base portion located at a predefined length from the insertion portion in an insertion direction, wherein the insertion direction is a direction of inserting the mating connection unit; and a plurality of terminals, each including: a fixation portion with one end fixed to the base portion; an extension portion with one end being contiguous with the fixation portion and another end extending in a reverse insertion direction opposite the insertion direction; and a connection portion with one end being contiguous with the extension portion and another end extending in the reverse insertion direction, the connection portion being capable of establishing continuity with corresponding one of the mating terminals, wherein the plurality of terminals are arrayed in a width direction, the width direction being a direction of a width of the housing, wherein the connection portion of each of the plurality of terminals includes a connecting base portion extending from the other end of the extension portion in an intersection direction intersecting the insertion direction and the width direction, a first arm extending from one end, on an intersection direction side, of the connecting base portion in the reverse insertion direction, and a second arm extending from another end, on the intersection direction side, of the connecting base portion in the reverse insertion direction, the first arm includes a support portion extending from a predefined location on the first arm on an extension side to a second arm side in the intersection direction, a sub-arm formed of a first sub-arm extending from an end of the support portion on the extension side in the reverse insertion direction, and a second sub-arm extending from that end in the insertion direction, a first contact portion protruding from the first sub-arm to the second arm side, and a second contact portion protruding from the second sub-arm to the second arm side, the second arm includes a pressing portion protruding toward a predefined location between the first contact portion and the second contact portion, the connection portion of each of the plurality of terminals is configured such that when the mating connection unit is inserted between the respective first arms and the respective second arms via the insertion portion, the pressing portion presses against the mating connection unit and at least either contact portion of the first contact portion and the second contact portion establishes continuity with the mating connection unit, and the extension portion has at least either one bent portion of a first bent portion that allows at least part of the extension portion to be displaced in a direction toward the fixation portion, and a second bent portion that allows at least part of the extension portion to be displaced in the intersection direction.

2. The connector according to claim 1, wherein the pressing portion lies at least in part opposite some portion of the second sub-arm.

3. The connector according to claim 1, wherein an end of the first sub-arm on the extension side has a second slope portion which is inclined to a first arm side as it goes in the reverse insertion direction starting at the first contact portion, and an end of the second sub-arm on the extension side has a third slope portion which is inclined to the first arm side as it goes in the reverse insertion direction starting at the second contact portion.

4. The connector according to claim 1, wherein the pressing portion lies at least in part opposite some portion of the second sub-arm.

5. The connector according to claim 1, wherein the extension portion is contiguous with the connection portion at a location between the one end and the other end of the connecting base portion.

6. The connector according to claim 5, wherein the pressing portion lies at least in part opposite some portion of the second sub-arm.

7. The connector according to claim 1, wherein a length of the extension in the first sub-arm is shorter than a length of the extension in the second sub-arm.

8. The connector according to claim 7, wherein the pressing portion lies at least in part opposite some portion of the second sub-arm.

9. The connector according to claim 1, wherein the housing has a plurality of guide portions extending from the base portion in the reverse insertion direction, the plurality of guide portions are arranged such that the guide portions and the terminals alternate in the width direction, and the guide portions each have a notch into which the mating connection unit can be inserted when the mating connection unit is inserted between the respective first arms and the respective second arms via the insertion portion.

10. The connector according to claim 9, wherein the first sub-arm has a first protrusion portion protruding from an end on an insertion portion side to a first arm side, and the first protrusion portion, at least in part, overlaps neighboring ones of the guide portions in the width direction, and an end of the first protrusion portion on its protrusion side is located on a sub-arm side with respect to an end of the first arm opposite to the sub-arm side.

11. The connector according to claim 9, wherein the pressing portion lies at least in part opposite some portion of the second sub-arm.

12. The connector according to claim 9, wherein an end of the second arm on the extension side has a first slope portion which is increasingly farther from the sub-arm as it goes in the reverse insertion direction starting at the pressing portion, and at least part of the end overlaps neighboring ones of the guide portions in the width direction.

13. The connector according to claim 12, wherein the pressing portion lies at least in part opposite some portion of the second sub-arm.

14. The connector according to claim 9, wherein the second sub-arm has a second protrusion portion protruding from an end on the extension side toward the first arm, and the second protrusion portion, at least in part, overlaps neighboring ones of the guide portions in the width direction, and is located at a predefined distance from the first arm.

15. The connector according to claim 14, wherein the first arm has a recess at a location opposite the second protrusion portion.

16. A connector comprising:

a housing including an insertion portion with a predefined width into which a mating connection unit having a plurality of mating terminals arrayed in a staggered arrangement across one and another surfaces can be inserted, and a base portion located at a predefined length from the insertion portion in an insertion direction, wherein the insertion direction is a direction of inserting the mating connection unit; and a plurality of terminals, each including: a fixation portion with one end fixed to the base portion; an extension portion with one end being contiguous with the fixation portion and another end extending in a reverse insertion direction opposite the insertion direction; and a connection portion with one end being contiguous with the extension portion and another end extending in the reverse insertion direction, the connection portion being capable of establishing continuity with corresponding one of the mating terminals, wherein the plurality of terminals are arrayed in a width direction, the width direction being a direction of a width of the housing, wherein the plurality of terminals are a plurality of first terminals and a plurality of second terminals alternately arranged in the width direction, the connection portion of each of the plurality of first terminals includes a connecting base portion extending from the other end of the extension portion in an intersection direction intersecting the insertion direction and the width direction, a first arm extending from one end, on an intersection direction side, of the connecting base portion in the reverse insertion direction, and a second arm extending from another end, on the intersection direction side, of the connecting base portion in the reverse insertion direction, the first arm includes a support portion extending from a predefined location on the first arm on an extension side to a second arm side in the intersection direction, a sub-arm formed of a first sub-arm extending from an end of the support portion on the extension side in the reverse insertion direction, and a second sub-arm extending from that end in the insertion direction, a first contact portion protruding from the first sub-arm to the second arm side, and a second contact portion protruding from the second sub-arm to the second arm side, the second arm includes a pressing portion protruding toward a predefined location between the first contact portion and the second contact portion, the connection portion of each of the plurality of second terminals has a configuration of the connection portion of the first terminal inverted about the insertion direction, and is connected with the extension portion of the second terminal, and the connection portion of each of the plurality of terminals is configured such that when the mating connection unit is inserted between the respective first arms and the respective second arms via the insertion portion, the pressing portion presses against the mating connection unit and at least either contact portion of the first contact portion and the second contact portion establishes continuity with the mating connection unit.

17. The connector according to claim 16, wherein the plurality of first terminals are configured such that the respective first contact portions are arrayed at positions that overlap in the width direction, the respective second contact portions are arrayed at positions that overlap in the width direction, and the respective pressing portions are arrayed at positions that overlap in the width direction, and the plurality of second terminals are configured such that the respective first contact portions are arrayed at positions that overlap in the width direction, the respective second contact portions are arrayed at positions that overlap in the width direction, and the respective pressing portions are arrayed at positions that overlap in the width direction.

* * * * *